(12) United States Patent
Goodman et al.

(10) Patent No.: US 12,267,441 B2
(45) Date of Patent: Apr. 1, 2025

(54) SYSTEM AND METHOD FOR SECURING OPERATION OF DATA PROCESSING SYSTEMS DURING AND AFTER ONBOARDING

(71) Applicant: Dell Products L.P., Round Rock, TX (US)

(72) Inventors: Bradley K. Goodman, Nashua, NH (US); Kirk Alan Hutchinson, Londonderry, NH (US); Joseph Caisse, Burlington, MA (US)

(73) Assignee: Dell Products L.P., Round Rock, TX (US)

( * ) Notice: Subject to any disclaimer, the term of this patent is extended or adjusted under 35 U.S.C. 154(b) by 193 days.

(21) Appl. No.: 18/046,595

(22) Filed: Oct. 14, 2022

(65) Prior Publication Data

US 2024/0129134 A1   Apr. 18, 2024

(51) Int. Cl.
*H04L 9/32* (2006.01)
*H04L 9/08* (2006.01)

(52) U.S. Cl.
CPC .......... *H04L 9/3265* (2013.01); *H04L 9/0819* (2013.01); *H04L 9/3247* (2013.01)

(58) Field of Classification Search
CPC ... G06F 21/575; H04L 9/3265; H04L 9/0819; H04L 9/0891; H04L 9/3247
See application file for complete search history.

(56) References Cited

U.S. PATENT DOCUMENTS

| | | | |
|---|---|---|---|
| 11,552,803 B1* | 1/2023 | Simkhada | G06F 21/73 |
| 2004/0193917 A1* | 9/2004 | Drews | G06F 21/10 |
| | | | 726/17 |
| 2006/0236111 A1 | 10/2006 | Bodensjo | |
| 2014/0298040 A1* | 10/2014 | Ignatchenko | G06F 21/575 |
| | | | 713/192 |
| 2019/0384916 A1 | 12/2019 | Shah | |
| 2020/0327231 A1 | 10/2020 | Smith | |
| 2021/0409231 A1* | 12/2021 | Fedorkow | H04L 41/0668 |
| 2022/0303123 A1* | 9/2022 | Cabre | H04L 9/0825 |
| 2023/0034615 A1* | 2/2023 | Detienne | H04L 63/0428 |
| 2023/0367489 A1* | 11/2023 | Dover | H04L 9/3239 |

(Continued)

OTHER PUBLICATIONS

K. Watsen et al. "A Voucher Artifact for Bootstrapping Protocols", May 2018, Internet Engineering Task Force (IETF) Request for Comments: 8366 (Year: 2018).*

(Continued)

*Primary Examiner* — Zhimei Zhu
(74) *Attorney, Agent, or Firm* — Womble Bond Dickinson (US) LLP (57) ABSTRACT

Systems, devices, and methods for managing operation of data processing systems are disclosed. To manage operation of the data processing systems, onboarding processes may be performed to conform the operation of the data processing systems to meet the expectations of owners of the data processing systems. During onboarding, keys usable to verify subsequently issued commands may be obtained by the data processing systems. The data processing systems may perform verifications processes for issued commands that rely on a root of trust established with the keys rather than identifies of entities that may issue the commands for command verification.

20 Claims, 7 Drawing Sheets

(56) References Cited

U.S. PATENT DOCUMENTS

| | | | | |
|---|---|---|---|---|
| 2023/0370454 | A1* | 11/2023 | Mohammed | H04L 63/102 |
| 2023/0394493 | A1* | 12/2023 | Rao | G06Q 30/018 |
| 2024/0039723 | A1* | 2/2024 | Ito | H04L 9/0825 |
| 2024/0064028 | A1* | 2/2024 | Fedorkow | H04L 9/3265 |

OTHER PUBLICATIONS

"Detailed Protocol Description—Secure Device Onboard", Apr. 28, 2021, obtained online from <https://secure-device-onboard.github.io/docs/1.8.0/protocol-specification/detailed-protocol-description/>, retrieved on Jul. 13, 2024 (Year: 2021).*

"Secure Device Onboard", 2020, obtained online from <https://secure-device-onboard.github.io/docs/1.9.0/>, retrieved on Oct. 11, 2024 (Year: 2020).*

G. Cooper et al., "FIDO Device Onboard Specification 1.1", Apr. 19, 2022, obtained online from <https://fidoalliance.org/specs/FDO/FIDO-Device-Onboard-PS-v1.1-20220419/FIDO-Device-Onboard-PS-v1.1-20220419.pdf>, retrieved on Oct. 11, 2024 (Year: 2022).*

\* cited by examiner

SYSTEM AND METHOD FOR SECURING OPERATION OF DATA PROCESSING SYSTEMS DURING AND AFTER ONBOARDING

FIELD

Embodiments disclosed herein relate generally to managing data processing systems. More particularly, embodiments disclosed herein relate to systems and methods to manage security of a data processing system that is adapted to delay processing of all unverified commands from all entities of a distributed system in which the data processing system resides.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and system for securely managing operation of a data processing system. The data processing system may provide computer implemented services. To provide the computer implemented services, the data processing system may need to operate in a predetermined manner. These manners may be different for different persons and/or owners of the data processing system.

To place the data processing system into compliance with the predetermined manners of operation, secure device onboarding (hereby referred to as "onboarding" and/or "secure onboarding") of a data processing system may be performed. Onboarding a data processing system may place the data processing system in an operating state desired by a user, owner, or other person, while also providing a secure way to permit future changes to the operation of the data processing system. Onboarding may permit the data processing system to be manufactured, warehoused, and sold, without any prior knowledge of which users, owners, and/or other persons will utilize the data processing system in the future.

To onboard a data processing system, various portions of data may be used by the data processing system. The data may be collected and used to obtain a package (e.g., an ownership voucher) that includes much of the data necessary to onboard the data processing system.

To reduce the likelihood of compromise of data processing system, the data processing systems and/or other system components may operate in accordance with a security framework. The security framework may provide a root of trust that defines authority over the data processing system. The ownership voucher may be implemented with certificates, keys, and/or other types of cryptographically verifiable data structures (e.g., cryptographically secure public keys from public key pairs) that allow for validation of policies and commands to be verified.

By doing so, embodiments disclosed herein may reduce the likelihood of compromise of the data processing system by placing the data processing system in a restricted functionality state until onboarded. During onboarding, the operation of the data processing system may be conformed to that expected by a new owner, and provided with information usable to verify subsequently received commands. Consequently, the data processing system may not rely on identifies of entities sending commands to validate the commands. Rather, the commands may be verified using the information obtained during onboarding and signatures for the commands.

Accordingly, the data processing system may be better able to operate in distributed systems in which various devices may become compromised. By not relying on identifies of devices as sources of authority, the data processing system may be less likely to be compromised. Thus, embodiments disclosed herein may address, among others, the technical problem of security in a distributed system. The disclosed embodiments may improve the security of data processing systems in distributed systems.

In an embodiment, a method for managing operation of a data processing system is provided. The method may include obtaining, by the data processing system, a key with authority over the data processing system, the key being obtained from an ownership voucher received by the data processing system during a secure onboarding of the data processing system; obtaining, by the data processing system and after completion of the secure onboarding, a command, the command specifying a change in operation of the data processing system, the command being allegedly signed by an entity with the authority over the data processing system; making, by the data processing system, a determination regarding whether the command is verifiable using the key and a chain of certificates from the ownership voucher, the chain of certificates defining a chain of trust to a root of trust for the data processing system; and in a first instance of the determination where the command is verifiable, executing, by the data processing system, the command to conform the operation of the data processing system to the change specified by the command.

The method may also include in a second instance of the determination where the command is not verifiable, delaying, by the data processing system, processing of the command.

Executing the command may include an operation from a group of operations consisting of: modifying a configuration of the data processing system; modifying a security policy of the data processing system; modifying a personalization settings of the data processing system; and modifying ownership of the data processing system.

The key may be a public key from a public key pair of a second entity to which authority over the data processing system is delegated.

The chain of certificates may specify changes in authority over the data processing system as the data processing system traversed through a channel of commerce.

The second entity may be an owner of the data processing system, the secure onboarding conforms the operation of the data processing system to at least one policy specified by the owner, and information regarding the policy being conveyed via a certificate of the ownership voucher.

The method may also include obtaining, by the data processing system and after completion of the secure onboarding, a second command, the second command specifying inclusion of a new certificate with the chain of certificates.

The method may further include verifying, using the key, that the second command is valid; adding the new certificate to a certificate repository.

The new certificate may specify a new key as having authority over the data processing system.

The method may also include obtaining, by the data processing system and after adding the new certificate to the certificate repository, a third command; making a second determination, using the new key, that the third command is not verifiable; and based on the second determination, delaying processing of the third command until it is verifiable.

In an embodiment, a non-transitory computer readable medium is provided. The non-transitory computer readable medium may include instructions which when executed by a processor cause the method to be provided.

In an embodiment, a data processing system is provided. The data processing system may include the processor and computer readable medium and may perform the method.

Figure 1:
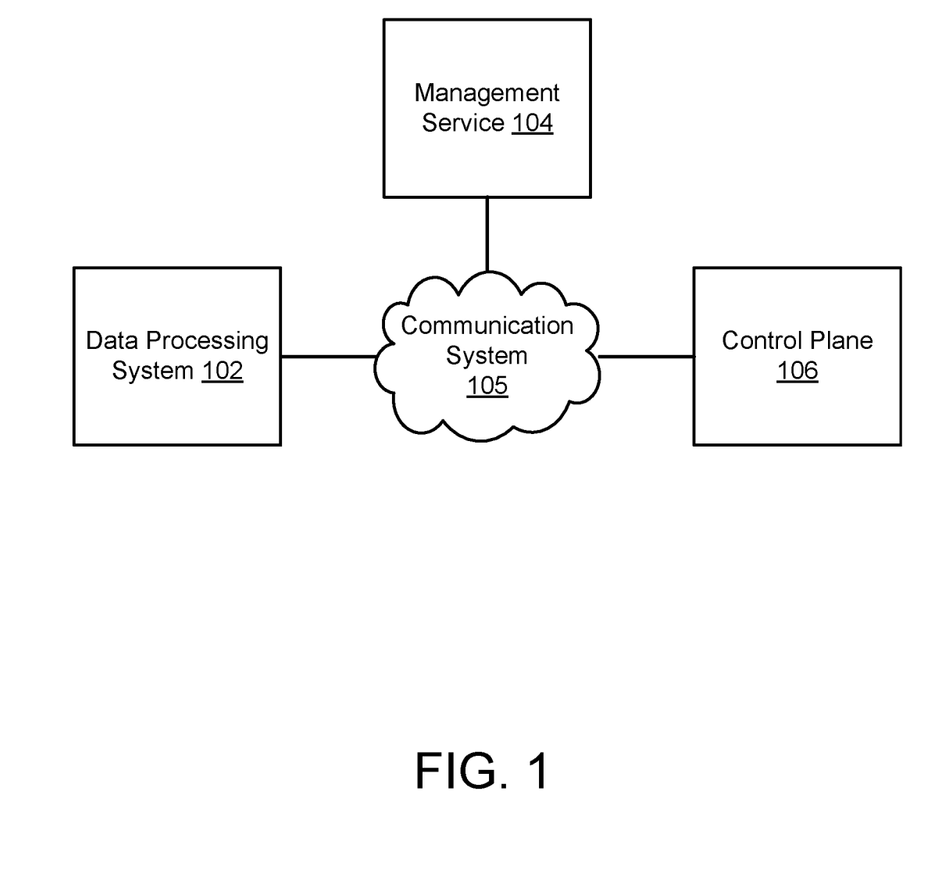
FIG. 1 shows a block diagram illustrating a system in accordance with an embodiment.

Turning to FIG. 1, a block diagram illustrating a system in accordance with an embodiment is shown. The system shown in FIG. 1 may provide computer implemented services. To provide the computer implemented services, the system may include any number of data processing systems (e.g., 102) with any number of configurations.

Overtime, additional data processing systems may need to be added to the system. For example, some existing data processing systems may fail and need to be replaced, the number of computer implemented services and/or capacity for the services may be expanded resulting in a need for additional data processing systems, and/or for other reasons.

Likewise, changes to operation of the data processing systems of the system may need to be made. For example, an owner of the system may wish to change the manner in which the data processing systems operate to address security threats, to improve performance of the data processing systems in certain areas, and/or for other reasons.

In general, embodiments disclosed herein provide systems, devices, and methods for securely providing computer implemented services. To securely provide computer implemented services, a framework for managing operation of data processing systems is provided. To manage the operation of the data processing systems, the framework may require that all commands (e.g., from control planes, from user of the data processing systems, etc.) be verified based on a root of authority. A chain from commands issued to the data processing systems back to the root of authority may need to be established for the commands to be validated. Otherwise, all commands regardless of source may not be processed, except in scenarios in which the root of authority has delegated authority of a data processing system to everyone. By implementing the framework risk of compromise of the data processing systems may be reduced.

To implement the framework, a data processing system may initially (e.g., at manufacturing when controlled by a root of authority) be placed in a more secure state of operation where functionalities of the data processing system are limited to reduce risk of compromise. The data processing system may then be late bound (e.g., when onboarded to a system of a purchaser) when added to a system (e.g., of a new owner). As part of the late binding process (e.g., during onboarding), a certificate and a key (e.g., a public key) may be installed in the data processing system. The certificate may indicate (e.g., directly or indirectly through a chain of certificates) that authority over the data processing system has been delegated to an entity associated with the public key.

Once installed, the data processing system may use the key and certificate (and/or other certificates) to validate whether commands can be validated as being approved by the root of authority. For example, the commands may be signed and the key may be used to validate whether the commands are from the entity designated by the certificate (and/or others forming a chain back to the root of authority) as having authority, delegated by the root, over the data processing system.

In the context of a manufacturer, distributor, and/or other upstream retailer selling a data processing system, the upstream retailer may obtain the key from the purchaser and may include it as part of an onboarding payload. The purchaser may use a key of, for example, a local control plane that the purchaser intends to use to manage the data processing system. In this manner, the purchaser of the data processing system may be provided with authority over the data processing system, as delegated by the root of trust.

To express which entities have authority to modify policies implemented by the data processing system, the data processing system may very whether the policies are authorized for implementation. A variety of different entities may have such authority over a data processing system including, for example, (i) an owner (with a corresponding owner key) as defined by a secure onboarding policy, (ii) a manufacturer as defined by an onboarding policy, (iii) a key (e.g., a cryptographically secure public key of an entity) enrolled in a specific trusted processing hierarchy (e.g., a Platform hierarchy) that defines authorities, (iv) a key in an extensible firmware interface database (which may or may not be specifically tagged to allow for policy alterations), (v) a certificate (e.g., an ownership voucher) initially deployed to the data processing system that includes a key (e.g., the owner key) which must be the signatory to any further policy alterations (and/or a root-signatory thereof), and/or (vi) another source of authority through which subsequently obtained certificates may be validated as being authorized by a root of trust (e.g., a manufacturer).

By doing so, embodiments disclosed herein improve the security of data processing system be reducing reliance on control planes or other end points subject to compromise. Rather, by requiring commands (e.g., even from control planes) be established before implementation, the system may reduce the risk of compromise.

To facilitate deployment and management of data processing system, a system in accordance with an embodiment may include management service 104 and control plane 106. Each of these components are discussed below.

Management service 104 may provide information (e.g., an ownership voucher) usable to securely onboard data processing systems (e.g., 102) to a system. The information may include, for example, (i) an initial set of certificates when manufacture that specify the root of authority, and policies to be implemented by the data processing system, (ii) during onboarding, an ownership voucher which may include certificates that provide chains back to the root of authority authority over data processing system 102, and a key (e.g., designated by a certificate and verifiable back to the root of trust) which may be used to validate commands.

Control plane 106 may be a management entity that may be operated by an entity to which authority over a data processing system is delegated. For example, when data processing system 102 is purchased by a purchaser, the new owner of data processing system 102 may onboard the data processing system to a system (e.g., through late binding). As part of that onboarding processing, management service 104 may provide data processing system 102 with an ownership voucher. The ownership voucher may include information such as an identity or network end point of control plane 106 necessary for the data processing system to join a domain managed by control plane 106. The ownership voucher may also include the certificates and key.

Figure 3:
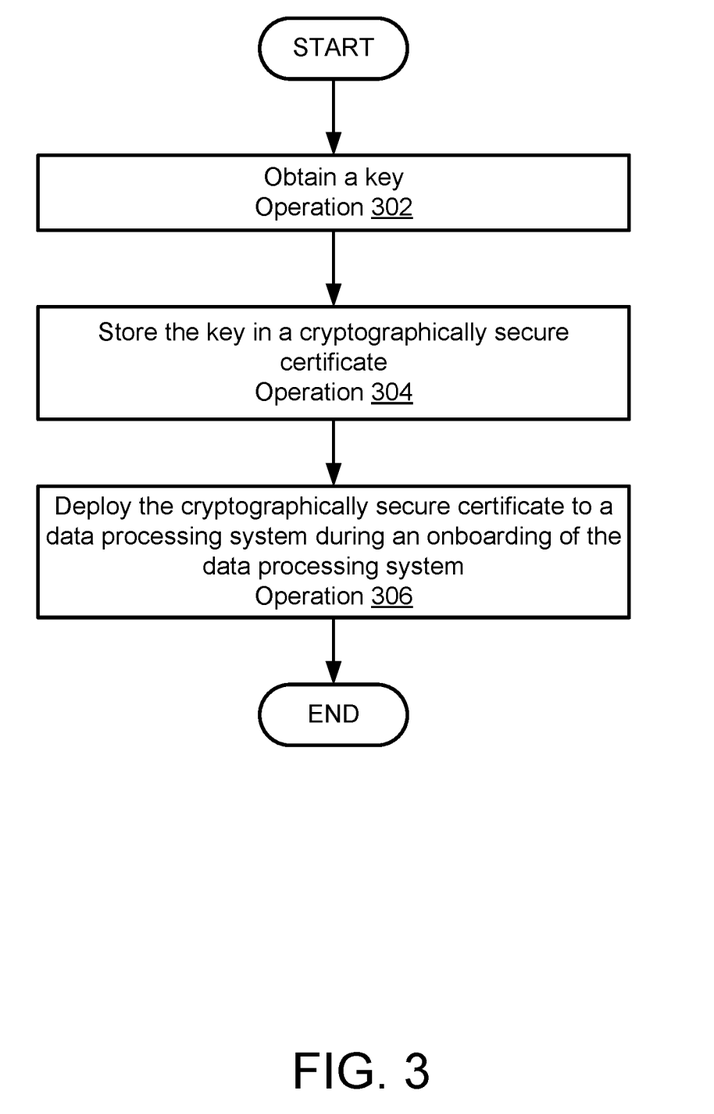
FIGS. 3-4 show flow diagrams illustrating methods for managing operation of a data processing system in accordance with an embodiment.
Figure 4:
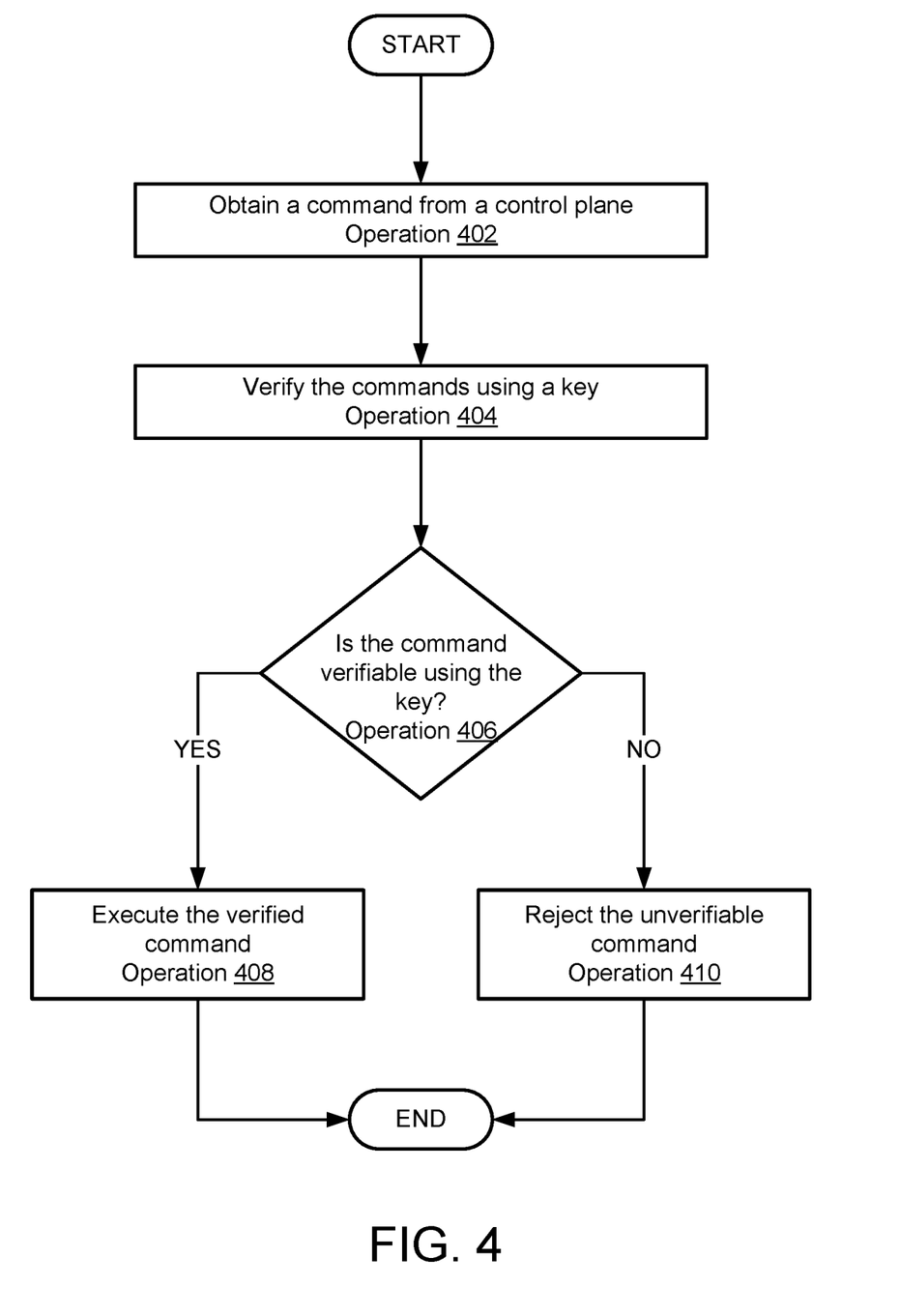

When providing its functionality, data processing system 102, management service 104, and/or control plane 106 may perform all, or a portion, of the methods shown in FIGS. 3-4.

Figure 5:
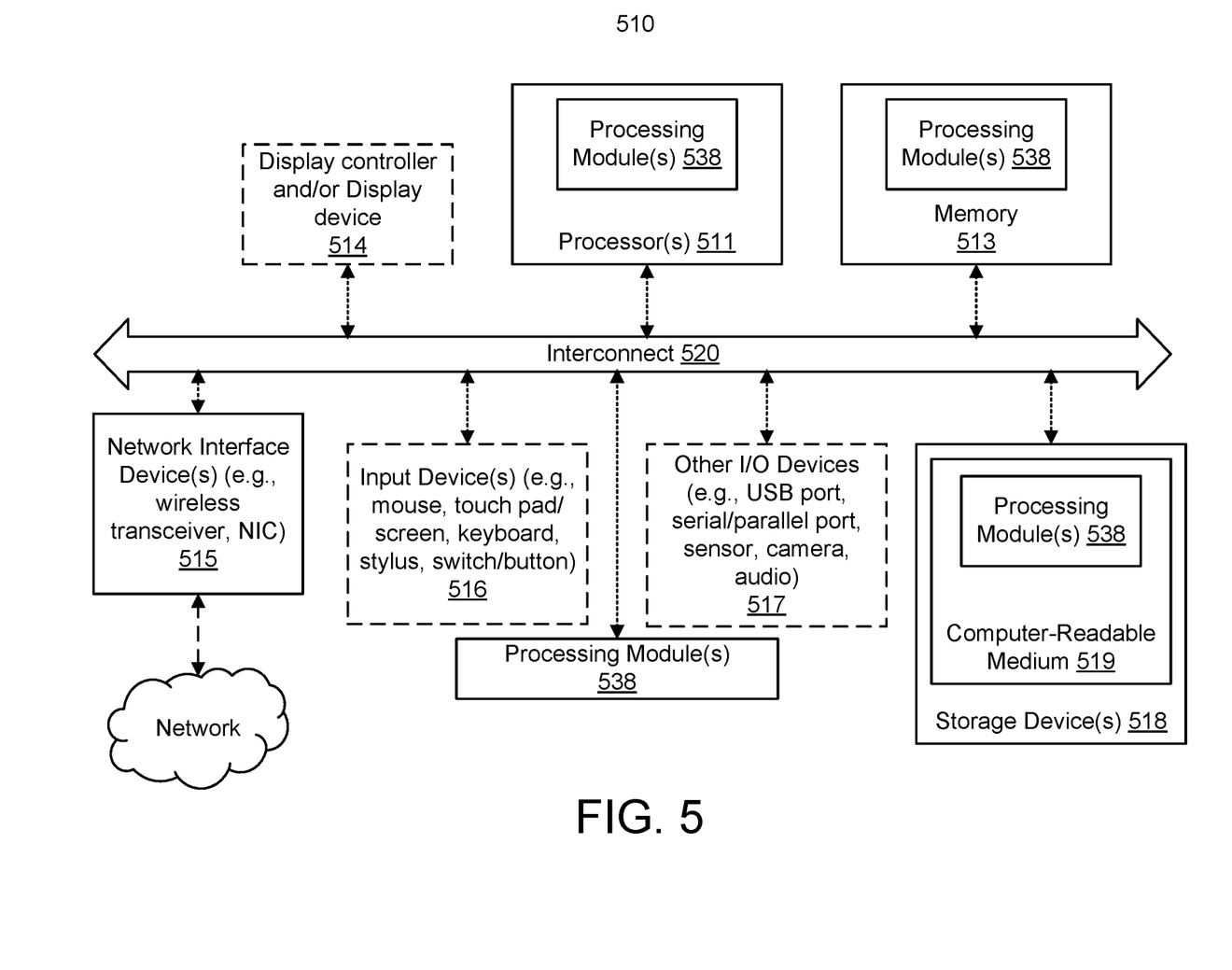
FIG. 5 shows a block diagram illustrating a data processing system in accordance with an embodiment.

Data processing system 102, management service 104, and/or control plane 106 may be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. Refer to FIG. 5 for additional information regarding computing devices.

Any of the components shown in FIG. 1, may be operably connected to each other (and/or components not illustrated) with communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

Figure 2A:
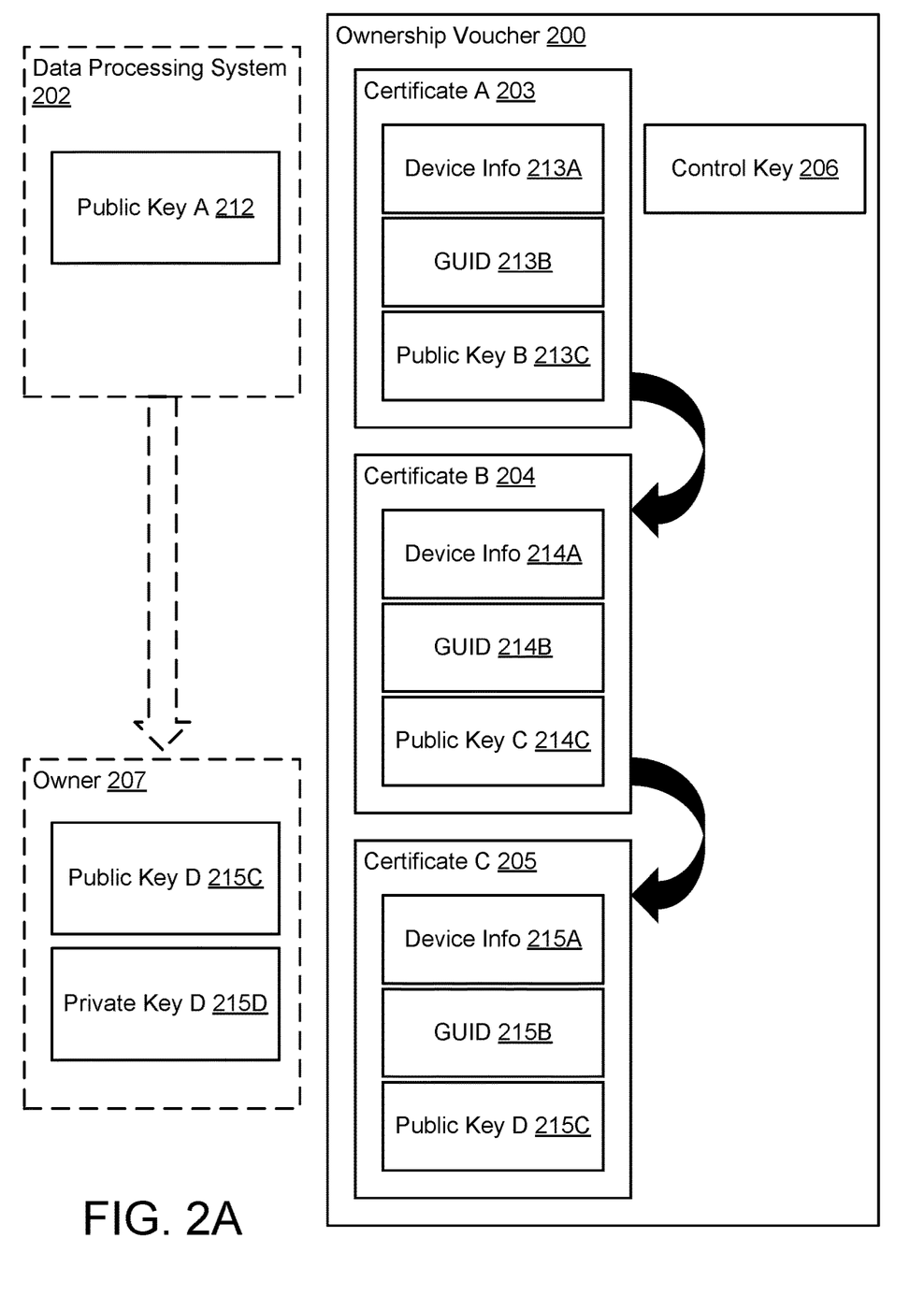
FIG. 2A shows a block diagram illustrating a system over time in accordance with an embodiment.

To further clarify generation and use of certificates in ownership vouchers to convey ownership and authority over data processing systems, a data flow diagram illustrating data flows (e.g., black arrows of FIG. 2A illustrating a temporal delegation of authority and dotted arrow of FIG. 2A illustrating an indirect delegation of authority) in a system in accordance with an embodiment is shown in FIG. 2A.

Turning to FIG. 2A, delegating authority over a data processing system (e.g., 102) using cryptographically secure certificates specifying a transfer in ownership in accordance with an embodiment is shown. These certificates may be included in ownership voucher 200 and may be deployed to the data processing system during onboarding of the data processing system. Each of these certificates are discussed below.

Now, consider a scenario in which a manufacturer constructs a data processing system (e.g., 202, may be similar to 102) through a manufacturing process. As part of manufacturing, the manufacturer may deploy a public key A 212 to the data processing system, public key A 212 being a cryptographically secure public key from a public key pair of a root of trust (e.g., the manufacturer). Public key A 212 may be used to verify certificates signed by, for example, a private key from the public key pair of the root of trust, thereby permitting the root of trust to change the operation of data processing system 202. Agents or other entities hosted by data processing system 202 may (i) limit access to public key A 212 and certificates (e.g., by storing them securely, and (ii) enforce authority delegation and verification using the public key and certificates.

After manufacturing, data processing system 202 may enter a channel of commerce in which the ownership of data processing system 202 may change due to the buying and selling of data processing system 202 between entities.

For example, the manufacturer may sell data processing system 202 to an entity B (e.g., an integrator that resells to an end-user). Upon purchase of data processing system 202 by entity B, a certificate A 203 may be generated, along with an ownership voucher 200 (an ownership voucher may be generated later, after certificates 203-205 are generated). Certificate A 203 may be stored in ownership voucher 200.

Certificate A 203 may define entity B (e.g., the integrator) as having authority to change operation of the data processing system. Certificate A 203 may be cryptographically signed, for example, by the private key from the public key pair of the root of trust, thereby allowing verification (e.g., using public key A 212) of certificate A 203 by the data processing system. Once verified (e.g., after the data processing system receives ownership voucher 200), certificate A 203 (and policies therein) may be implemented by the data processing system.

Certificate A 203 may include (i) device info 213A, information about the device (e.g., serial number, component specifications, and/or other information used to describe the data processing system), (ii) a globally unique identifier (GUID) 213B, used as an identification tool for the data processing system, and (iii) public key B 213C, to be discussed below.

Public key B 213C may be a cryptographically secure public key from a public key pair of entity B (e.g., the integrator). Public key B 213C may be used to verify certificates signed by, for example, a private key from the public key pair of entity B, thereby permitting entity B to change the operation of data processing system 202.

Continuing the scenario above, entity B may sell data processing system 202 to an entity C. Upon purchase of data processing system 202 by entity C, a certificate B 204 may be generated and then stored in ownership voucher 200 (or later, as part of an onboarding process). Certificate B 204 may define entity C as having authority to change operation of data processing system 202. Certificate B 204 may be cryptographically signed, for example, by the private key from the public key pair of entity B, thereby allowing verification (e.g., using public key B 213) of certificate B 203 by the data processing system. Once verified, certificate B 204 (and policies therein) may be implemented by the data processing system. Certificate B 204 may include (i) device info 214A, a copy of device info 213A, (ii) a GUID 214 B, a copy of GUID 213B, and (iii) public key C 214C, to be discussed below.

Public key C 214C may be a cryptographically secure public key from a public key pair of entity C. Public key C 214C may be used to verify certificates signed by, for example, a private key from the public key pair of entity C, thereby permitting entity C to change the operation of the data processing system.

Continuing the scenario above, entity C may sell the data processing system to an owner 207. Upon purchase of the data processing system by owner 207, a certificate C 205 may be generated and then stored in ownership voucher 200. Certificate C 205 may define owner 207 as having authority to change operation of data processing system 202. Certificate C 205 may be cryptographically signed, for example, by the private key from the public key pair of entity C, thereby verifying (e.g., using public key C 214C) that entity C has permitted delegation of authority to the owner 207. Certificate C 205 may include (i) device info 215A, a copy of device info 214A, (ii) a GUID 215 B, a copy of GUID 214 B, and (iii) public key D 215C, to be discussed below.

Public key D 215C may be a cryptographically secure public key from a public key pair of owner 207. The owner 207 may have possession of public key D 215C and a private key D 215D, from the public key pair of the owner 207. Public key D 215C may be used to verify certificates signed by, for example, private key D 215D, thereby permitting owner 207 to change the operation of data processing system 202.

In some embodiments, along with the process of delegating authority using cryptographically signed certificates, control key 206 may be delegated authority at any point in time between manufacturing of the data processing system to the data processing system reaching its final destination. Control key 206 may be delegated authority by any other entity to which authority over data processing system (e.g., the manufacturer, entity B, entity C, and the owner 207) has been delegated.

By doing so, the operation of data processing system 202 may be conformed to the expectations of the delegated authority using a verifiable set of certificates (made verifiable using cryptographically secure keys) with authority delegated from the root of trust (e.g., the manufacturer).

In some embodiments, control key 206 may not only be used to only to delegate authority and implement verified commands but may permit an ability to strip software from the data processing system and/or strip control from other keys and/or entities.

Thus, as illustrated in FIG. 2A, the framework for managing security of data processing systems in accordance with embodiments disclosed herein may facilitate a delegation of authority to change operation of a data processing system prior to onboarding to reduce the risk of compromise, while also allowing for seamless onboarding and placing the data processing system into compliance with the owner of the data processing system.

Figure 2B:
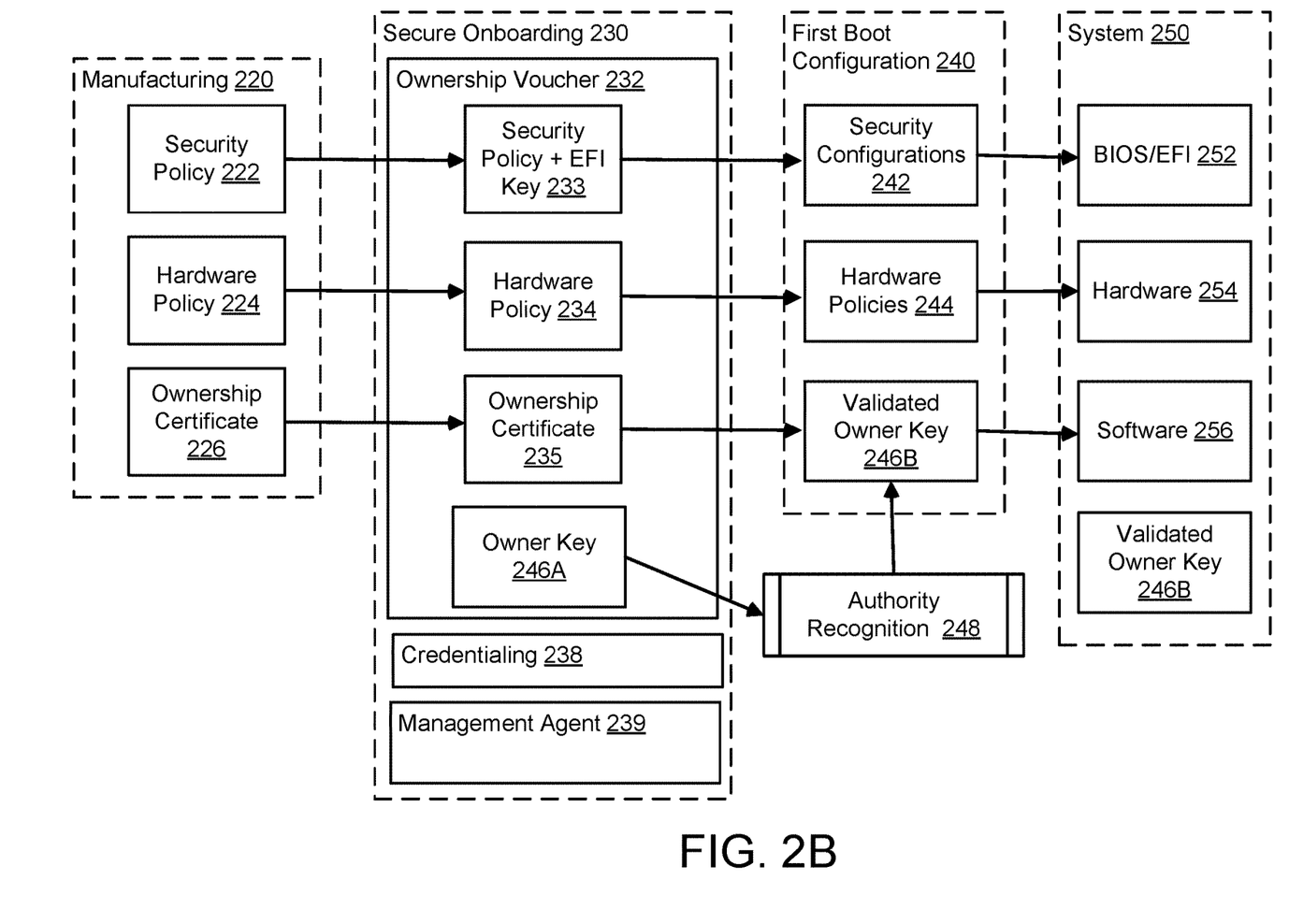
FIG. 2B shows a block diagram illustrating an onboarding of a data processing system in accordance with an embodiment.
Figure 2C:
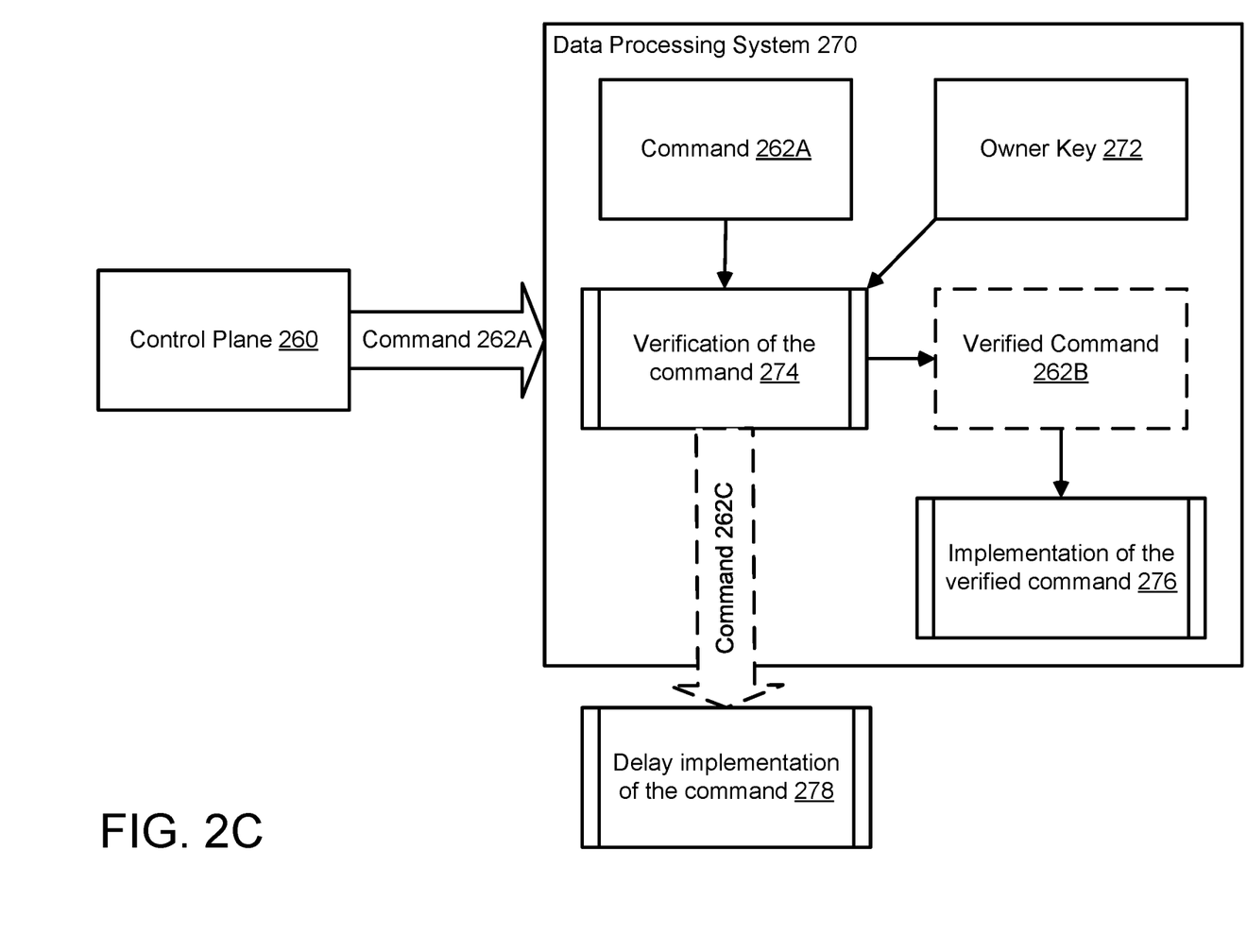
FIG. 2C shows a block diagram illustrating a verification in accordance with an embodiment.

Turning to FIGS. 2B-2C, data structures usable by components of the system of FIG. 1-2A are shown. Any of these data structures may be implemented using, for example, lists, tables, databases, linked lists, and/or other type of data structures. Any of the data structures may be shared, spanned across multiple devices, and may be maintained and used by any number of entities. Additionally, while illustrated as including a limited amount of specific data, any of these data structures may include additional, less, and/or different data without departing from embodiments disclosed herein.

Turning to FIG. 2B, a diagram illustrating data structures and interactions between system components in accordance with an embodiment is shown. All, or a portion of, processing illustrated in FIG. 2A may be implemented as part of the process illustrated in FIG. 2B. For example, the diagram shown in FIG. 2B may illustrate a process through which the data structures may be used to complete a secure onboarding of a data processing system and through which the data processing system may be placed into compliance with an owner's security expectations.

Now, consider a scenario as shown in FIG. 2B in which a manufacturer constructs a data processing system (e.g., 102 and/or 202) through a process of manufacturing 220. As part of manufacturing 220, various certificates (222-226) may define security policies, hardware policies, and ownership of data processing system may be stored on the data processing system. Generally, these policies may be restrictive to reduce the likelihood of undesired use and/or interactions with the data processing system. For example, the resulting security policies may limit ability for the data processing system to be booted, may define which pieces of software may be executed by the data processing system (e.g., extensible firmware interface (EFI) keys), etc. The certificates may also define who has authority to make changes to these restrictions.

After manufacturing 220, data processing system 102 may be purchased and an intended owner may wish to conform the operation of data processing system 102 to meet certain criteria. To do so, the intended owner may wish to perform an onboarding of the data processing system.

To onboard data processing system 102, secure onboarding 230 may be performed. As part of secure onboarding 230, various data structures including ownership voucher 232, credentialing 236, and management agent 239 may be used.

Ownership voucher 232 may include the various certificates (e.g., 233-235) that may delegate authority over data processing system 102 to another party and/or may modify the security policies and/or hardware policies defined by the certificates (e.g., 222-226) deployed by the manufacturer. The authority delegated by the manufacturer may not remove the manufacturer as the root of trust. Rather, the manufacturer may retain its authority over data processing system 102 including, for example, the ability to revoke the delegated authority. The ownership voucher may be obtained, for example, from a management service (e.g., management service 104 from FIG. 1) of the data processing system's manufacturer, a partner, or another entity.

Ownership voucher 232 may delegate authority by including certificates that are verifiable by data processing system 102. The certificates may be cryptographically signed. The certificates may include, for example, (i) security policy+ EFI key 233 that may modify (e.g., updates, changes, etc.)

previously implemented security policies (e.g., security policy 222), (ii) hardware policy 234 that may include secure component validation (SCV) information to validate the integrity of the hardware of data processing system 102 (e.g., verify that the data processing system has not been tampered with since the generation of hardware policy 224 during manufacturing of the computing device), (iii) ownership certificate 235 which may include information about the data processing system's intended owner, and (iv) owner key 246A, a cryptographically secure public key from a public key pair of the intended owner (or another entity to which control authority has been delegated, may be control key 206 discussed with respect to FIG. 2A). The owner key 246A may undergo an authority recognition 248 process. During the process, the owner key 246A is verified to belong to the public key pair of the intended owner (and/or verified to be traceable back to a root of authority having delegated authority to owner key 246A, as discussed with respect to FIG. 2A), discussed further with regard to FIGS. 3-4. If verified, the owner key 246A may be stored as a validated owner key 246B.

The ownership voucher 232 may be utilized along with credentialing 238 to permit data processing system 102 to join a domain and/or access to a control plane through which data processing system 102 may be further managed. Credentialing 238 may include both server credentials and/or client credentials. Server credentials and/or client credentials may be credentials obtained from the control plane (e.g., 106) that will be used by an owner to manage it.

Management agent 239 may also be utilized along with the ownership voucher 232 and credentialing 238. The management agent 239 may identify a location (e.g., a URL) from which a software loadout (required for onboarding) is to be obtained. Credentialing 238 and management agent 239 may be obtained from the intended owner of the data processing system.

Secure onboarding 230 may place data processing system 102 in condition to operate in a manner as expected by the intended owner. For example, the changes in security policies as defined by the certificates in the ownership voucher may conform the operation of the data processing system to that expected by the intended owner.

After secure onboarding 230, data processing system 102 may begin to operate. For example, data processing system 102 may perform first boot configuration 240. During first boot configuration 240, data processing system 102 may resolve (e.g., validate, and apply various changes specified by the certificates) the certificates stored on it to identify how it will operate. For example, data processing system may establish security configurations 242 (e.g., that may limit booting, software that may execute, etc.), hardware policies 244 (e.g., settings for hardware devices), and the validated owners key 246B (e.g., usable to ascertain whether to follow signed instructions from a control plane based on verification from authority recognition 248). These data structures may guide the operation of data processing system 102 post onboarding.

Once first boot configuration 240 is complete, data processing system 102 may enter system operation 250 phase. During system operation 250, the configurations and/or other changes (e.g., identification of public keys to which authority has been delegated, such as the validated owner key 246B based on the authority recognition 248) made during first boot configuration 240 may be used to manage (i) operation of a basic input output system (BIOS) and extensive firmware interface (EFI) keys 252, (ii) operation/verification of hardware (254), (iii) installation of software 256 (e.g., specified by the software loadout/management agent and/or local control plane via instructions signed by the local control plane an verified with the designed public key), and/or (iv) storage of validated owner key 246B onto the data processing system for future utilization (to be further discussed with regard to the methods described in FIGS. 3-4) to securely change operation of the data processing system, while also being less likely to implement unverifiable changes.

By doing so, the operation of data processing system 102 may be conformed to the expectations of the intended owner using a verifiable set of certificates and an owner key with authority delegated from the root of trust (e.g., the manufacturer).

Thus, as illustrated in FIG. 2B, the framework for managing data processing systems in accordance with embodiments disclosed herein may facilitate restricting operation of the data processing system prior to onboarding to reduce the risk of compromise, while also allowing for seamless onboarding and placing the data processing system into compliance with expectations of the intended owner of the data processing system.

Turning to FIG. 2C, a diagram illustrating data structures and interactions between system components in accordance with an embodiment is shown. The processing illustrated in FIG. 2B may be implemented prior to the processing illustrated in FIG. 2C. For example, the diagram shown in FIG. 2B may illustrate a process through which the data structures may be used to complete a secure onboarding of a data processing system. The onboarding may place the data processing system into compliance with an owner's expectations. Once the data processing system is in compliance with the owner's expectations, further changes to operation of the data processing system may be implemented, as illustrated in FIG. 2C.

Now, consider a scenario as shown in FIG. 2C in which a control plane (e.g., 260, may be similar to 106) transmits a command (e.g., 262A) to an onboarded data processing system (e.g., 270). Prior to implementation, command 262A may undergo a verification process (e.g., 274). During the verification process, owner key 272 (e.g., validated owner key 246B of FIG. 2B or control key 206 of FIG. 2A) may be used to make a determination regarding whether the command has been signed by an entity to which control over the data processing system has been delegated. The determination may be made by using owner key 272 to validate the signature.

The dashed outlines of verified command 262B and command 262C of FIG. 2C represent possible outcomes from this determination. The determination may cause the data processing system to (i) label the command as a verified command (e.g., 262B) if it is determined that the control plane is an authorized user with privilege to execute the command, or, if the control plane is unable to be verified, (ii) delay the command (e.g., 262C), both outcomes discussed further below.

If the command is verified, then the data processing system may perform implementation of verified command 276. This implementation may conform the operation of the data processing system to that specified by the verified command.

If the command is unable to be verified, then the data processing system may delay implementation of the command (e.g., 278). Delaying implementation may include (i) requesting additional information from the control plane to attempt to verify the command, (ii) deleting the command, and/or (iii) any other form of refraining from implementation of the command until verified.

By doing so, a system in accordance with an embodiment may reduce the risk of compromise from unverifiable commands to a data processing system during, and/or after onboarding to a system. The process illustrated in FIG. 2C may be further discussed below with regard to FIG. 4.

As discussed above, various components of the system of FIG. 1 may perform various methods for securely managing operation of a data processing system. FIGS. 3-4 show methods that may be performed to secure data processing systems that provide computer implemented services prior to, during, and/or after joining a system owned by an owner. While FIGS. 3-4 are illustrated with operations in a specific order, the operations may be performed in different orders, any of the operations may be omitted, additional operations (not shown) may be performed, and/or any of the operations may be performed in a parallel or partially overlapping in time manner with respect to other operations.

Turning to FIG. 3, a flow diagram illustrating a method for managing a data processing system in accordance with an embodiment is shown. The method illustrated in FIG. 3 may be performed, for example, by a management service and/or other components of the system of FIG. 1.

At operation 302, a key is obtained. The key may be obtained by, for example, receiving it via a message, by downloading it from a location, by reading it from storage, etc. The key may be obtained (e.g., received) directly, and/or indirectly, from an entity to which authority over a data processing system is to be delegated.

At operation 304, the key is stored in a cryptographically secure certificate (e.g., an ownership voucher). The key may be stored in the cryptographically secure certificate by generating a data structure including the key, and signing the data structure using a private key. The private key may be part of a public-private key pair of an entity to which sufficient authority over the data processing has been delegated to delegate authority to the entity associated with the key.

At operation 306, the cryptographically secure certificate (e.g., the ownership voucher) is deployed to the data processing system during an onboarding of the data processing system. The cryptographically secure certificate may be deployed by (i) adding the cryptographically secure certificate to an ownership voucher, (ii) providing a copy of the ownership voucher to the data processing system, and (iii) processing of the copy of the ownership voucher by the data processing system.

The data processing system may process the copy of the ownership voucher by storing certificates and keys from the owner ship voucher in secure storage (e.g., a repository). Additionally, the data processing system may identify chains between the root of authority and various entities as specified by the certificates.

The method may end following operation 306.

Turning to FIG. 4, a flow diagram illustrating methods for processing commands in accordance with an embodiment is shown. The method illustrated in FIG. 4 may be performed, for example, by a data processing system and/or other components of the system of FIG. 1.

At operation 402, a command is obtained from a control plane. The command may be obtained by receiving it in a message, reading it from a predetermined location, and/or via other processes.

For example, the data processing system and the control plane may be in operable communication with one another. The control plane may add the command to a message and send it to the data processing system.

At operation 404, the command is verified using a key. The command may be verified by (i) calculating a hash (or other cryptographic function output used in the signature generation process) of the digest used to sign the command (e.g., the digest may be some contents of the command, and/or other data included with the command), (ii) decrypting the signature using the key, and (ii) comparing the hash to the decrypted signature. If the hash and the decrypted signature match, then the command may be considered to be verifiable. Otherwise, the command may not be considered to be verifiable.

At operation 406, a determination is may be made regarding whether the command is verifiable using the key. The determination may be made based on the outcome of operation 404.

If the command is verifiable, then the methods may proceed to operation 408 following operation 406. Otherwise, the method may proceed to operation 410 following operation 406.

At operation 408, the verified command is executed. The verified command may be executed by performing one or more actions to implement the verified command. The command may explicitly or implicitly specify the one or more actions.

The method may end following operation 408.

Returning to operation 406, the method may proceed to operation 410 following operation 406 when the command is determined to be unverifiable.

At operation 410, the unverifiable command is be rejected, or delayed. The delay (e.g., the rejection) may be performed by not implementing actions specified by the unverifiable command.

The method may end following operation 410.

Using the methods illustrated in FIGS. 3-4, a system in accordance with an embodiment may have a reduced risk of compromise by not relying on identities of entities as sources of authority.

Additionally, using the method illustrated in FIG. 4, a entity to which authority over the data processing system has been delegated may further delegate authority. For example, the entity may send a command instructing the data processing system to add a new certificate to the certificate repository. The certificate may specify a new key of a new entity to which authority over the data processing system is delegated. Once delegated, the entity may no longer be able to control the data processing system through commands (i.e., the signatures of the commands signed by the entity may not be verifiable using a key of the new entity).

Any of the components illustrated in FIGS. 1-5 may be implemented with one or more computing devices. Turning to FIG. 5, a block diagram illustrating an example of a data processing system (e.g., a computing device) in accordance with an embodiment is shown. For example, system 510 may represent any of data processing systems described above performing any of the processes or methods described above. System 510 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 510 is intended to show a high-level view of many components of the computer system. However, it is to be understood that additional components may be present in certain implementations and furthermore, different arrangement of the components shown may occur in other implementations. System 510 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 510 includes processor 511, memory 513, and devices 515-517 via a bus or an interconnect 520. Processor 511 may represent a single processor or multiple processors with a single processor core or multiple processor cores included therein. Processor 511 may represent one or more general-purpose processors such as a microprocessor, a central processing unit (CPU), or the like. More particularly, processor 511 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 511 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 511, which may be a low power multi-core processor socket such as an ultra-low voltage processor, may act as a main processing unit and central hub for communication with the various components of the system. Such processor can be implemented as a system on chip (SoC). Processor 511 is configured to execute instructions for performing the operations discussed herein. System 510 may further include a graphics interface that communicates with optional graphics subsystem 514, which may include a display controller, a graphics processor, and/or a display device.

Processor 511 may communicate with memory 513, which in one embodiment can be implemented via multiple memory devices to provide for a given amount of system memory. Memory 513 may include one or more volatile storage (or memory) devices such as random access memory (RAM), dynamic RAM (DRAM), synchronous DRAM (SDRAM), static RAM (SRAM), or other types of storage devices. Memory 513 may store information including sequences of instructions that are executed by processor 511, or any other device. For example, executable code and/or data of a variety of operating systems, device drivers, firmware (e.g., input output basic system or BIOS), and/or applications can be loaded in memory 513 and executed by processor 511. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 510 may further include IO devices such as devices (e.g., 515, 515, 517, 518) including network interface device(s) 515, optional input device(s) 515, and other optional IO device(s) 517. Network interface device(s) 515 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 515 may include a mouse, a touch pad, a touch sensitive screen (which may be integrated with a display device of optional graphics subsystem 514), a pointer device such as a stylus, and/or a keyboard (e.g., physical keyboard or a virtual keyboard displayed as part of a touch sensitive screen). For example, input device(s) 515 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity data collector arrays or other elements for determining one or more points of contact with the touch screen.

IO devices 517 may include an audio device. An audio device may include a speaker and/or a microphone to facilitate voice-enabled functions, such as voice recognition, voice replication, digital recording, and/or telephony functions. Other IO devices 517 may further include universal serial bus (USB) port(s), parallel port(s), serial port(s), a printer, a network interface, a bus bridge (e.g., a PCI-PCI bridge), data collector(s) (e.g., a motion data collector such as an accelerometer, gyroscope, a magnetometer, a light data collector, compass, a proximity data collector, etc.), or a combination thereof. IO device(s) 517 may further include an imaging processing subsystem (e.g., a camera), which may include an optical data collector, such as a charged coupled device (CCD) or a complementary metal-oxide semiconductor (CMOS) optical data collector, utilized to facilitate camera functions, such as recording photographs and video clips. Certain data collectors may be coupled to interconnect 520 via a data collector hub (not shown), while other devices such as a keyboard or thermal data collector may be controlled by an embedded controller (not shown), dependent upon the specific configuration or design of system 510.

To provide for persistent storage of information such as data, applications, one or more operating systems and so forth, a mass storage (not shown) may also couple to processor 511. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also, a flash device may be coupled to processor 511, e.g., via a serial peripheral interface (SPI). This flash device may provide for non-volatile storage of system software, including a basic input/output software (BIOS) as well as other firmware of the system.

Storage device 518 may include computer-readable storage medium 519 (also known as a machine-readable storage medium or a computer-readable medium) on which is stored one or more sets of instructions or software (e.g., processing module, unit, and/or processing module/unit/logic 538) embodying any one or more of the methodologies or functions described herein. Processing module/unit/logic 538 may represent any of the components described above. Processing module/unit/logic 538 may also reside, completely or at least partially, within memory 513 and/or within processor 511 during execution thereof by system 510, memory 513 and processor 511 also constituting machine-accessible storage media. Processing module/unit/logic 538 may further be transmitted or received over a network via network interface device(s) 515.

Computer-readable storage medium 519 may also be used to store some software functionalities described above persistently. While computer-readable storage medium 519 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 538, components and other features described herein can be implemented as discrete hardware components or integrated in the functionality of hardware components such as ASICS, FPGAs, DSPs or similar devices. In addition, processing module/unit/logic 538 can be implemented as firmware or functional circuitry within hardware devices. Further, processing module/unit/logic 538 can be implemented in any combination hardware devices and software components.

Note that while system 510 is illustrated with various components of a data processing system, it is not intended to represent any particular architecture or manner of interconnecting the components as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:
    obtaining, by the data processing system, a key with authority over the data processing system, the key being obtained from an ownership voucher received by the data processing system during a secure onboarding of the data processing system;
    obtaining, by the data processing system and after completion of the secure onboarding, a command, the command specifying a change in operation of the data processing system, the command being allegedly signed by an entity with the authority over the data processing system;
    making, by the data processing system, a determination regarding whether the command is verifiable using the key and a chain of certificates from the ownership voucher, the chain of certificates defining a chain of trust to a root of trust for the data processing system; and
    in a first instance of the determination where the command is verifiable, executing, by the data processing system, the command to conform the operation of the data processing system to the change specified by the command.

2. The method of claim 1, further comprising:
    in a second instance of the determination where the command is not verifiable, delaying, by the data processing system, processing of the command.

3. The method of claim 2, wherein executing command comprises an operation from a group of operations consisting of:

modifying a configuration of the data processing system;
modifying a security policy of the data processing system;
modifying a personalization settings of the data processing system; and
modifying ownership of the data processing system.

4. The method of claim 1, wherein the key is a public key from a public key pair of a second entity to which authority over the data processing system is delegated.

5. The method of claim 4, wherein the chain of certificates specifies changes in authority over the data processing system as the data processing system traversed through a channel of commerce.

6. The method of claim 4, wherein the second entity is an owner of the data processing system, the secure onboarding conforms the operation of the data processing system to at least one policy specified by the owner, and information regarding the policy being conveyed via a certificate of the ownership voucher.

7. The method of claim 1, further comprising:
obtaining, by the data processing system and after completion of the secure onboarding, a second command, the second command specifying inclusion of a new certificate with the chain of certificates.

8. The method of claim 7, further comprising:
verifying, using the key, that the second command is valid;
adding the new certificate to a certificate repository.

9. The method of claim 8, wherein the new certificate specifies a new key as having authority over the data processing system.

10. The method of claim 9, further comprising:
obtaining, by the data processing system and after adding the new certificate to the certificate repository, a third command;
making a second determination, using the new key, that the third command is not verifiable; and
based on the second determination, delaying processing of the third command until it is verifiable.

11. A non-transitory machine-readable medium having instructions stored therein, which when executed by a processor, cause the processor to perform operations for managing operation of a data processing system, the operations comprising:
obtaining, by the data processing system, a key with authority over the data processing system, the key being obtained from an ownership voucher received by the data processing system during a secure onboarding of the data processing system;
obtaining, by the data processing system and after completion of the secure onboarding, a command, the command specifying a change in operation of the data processing system, the command being allegedly signed by an entity with the authority over the data processing system;
making, by the data processing system, a determination regarding whether the command is verifiable using the key and a chain of certificates from the ownership voucher, the chain of certificates defining a chain of trust to a root of trust for the data processing system; and
in a first instance of the determination where the command is verifiable, executing, by the data processing system, the command to conform the operation of the data processing system to the change specified by the command.

12. The non-transitory machine-readable medium of claim 11, wherein the operations further comprise:
in a second instance of the determination where the command is not verifiable, delaying, by the data processing system, processing of the command.

13. The non-transitory machine-readable medium of claim 12, wherein executing command comprises an operation from a group of operations consisting of:
modifying a configuration of the data processing system;
modifying a security policy of the data processing system;
modifying a personalization settings of the data processing system; and
modifying ownership of the data processing system.

14. The non-transitory machine-readable medium of claim 11, wherein the key is a public key from a public key pair of a second entity to which authority over the data processing system is delegated.

15. The non-transitory machine-readable medium of claim 14, wherein the chain of certificates specifies changes in authority over the data processing system as the data processing system traversed through a channel of commerce.

16. A data processing system, comprising:
a processor; and
a memory coupled to the processor to store instructions, which when executed by the processor, cause the processor to perform operations for managing operation of the data processing system, the operations comprising:
obtaining a key with authority over the data processing system, the key being obtained from an ownership voucher received by the data processing system during a secure onboarding of the data processing system;
obtaining, after completion of the secure onboarding, a command, the command specifying a change in operation of the data processing system, the command being allegedly signed by an entity with the authority over the data processing system;
making a determination regarding whether the command is verifiable using the key and a chain of certificates from the ownership voucher, the chain of certificates defining a chain of trust to a root of trust for the data processing system; and
in a first instance of the determination where the command is verifiable, executing the command to conform the operation of the data processing system to the change specified by the command.

17. The data processing system of claim 16, wherein the operations further comprise:
in a second instance of the determination where the command is not verifiable, delaying, processing of the command.

18. The data processing system of claim 17, wherein executing command comprises an operation from a group of operations consisting of:
modifying a configuration of the data processing system;
modifying a security policy of the data processing system;
modifying a personalization settings of the data processing system; and
modifying ownership of the data processing system.

19. The data processing system of claim 16, wherein the key is a public key from a public key pair of a second entity to which authority over the data processing system is delegated.

20. The data processing system of claim 19, wherein the chain of certificates specifies changes in authority over the data processing system as the data processing system traversed through a channel of commerce.

\* \* \* \* \*